(12) United States Patent  (10) Patent No.: US 9,204,304 B2
Mao et al.  (45) Date of Patent: Dec. 1, 2015

(54) ELECTRONIC TERMINALS AND CONTROL METHODS THEREOF

(75) Inventors: Xingzhong Mao, Beijing (CN); Lvming Lin, Beijing (CN); Wei Xie, Beijing (CN); Zhiqiang Zhou, Beijing (CN)

(73) Assignees: LENOVO (BEIJING) LIMITED, Beijing (CN); Beijing Lenovo Software Ltd., Beijing (CN)

( * ) Notice: Subject to any disclaimer, the term of this patent is extended or adjusted under 35 U.S.C. 154(b) by 0 days.

(21) Appl. No.: 14/343,349

(22) PCT Filed: Aug. 30, 2012

(86) PCT No.: PCT/CN2012/080776
§ 371 (c)(1),
(2), (4) Date: Mar. 6, 2014

(87) PCT Pub. No.: WO2013/034063
PCT Pub. Date: Mar. 14, 2013

(65) Prior Publication Data
US 2014/0220959 A1  Aug. 7, 2014

(30) Foreign Application Priority Data
Sep. 9, 2011  (CN) .......................... 2011 1 0268237

(51) Int. Cl.
*H04M 3/00* (2006.01)
*H04W 12/08* (2009.01)
(Continued)

(52) U.S. Cl.
CPC ............. *H04W 12/08* (2013.01); *G06F 1/3206* (2013.01); *G06F 1/3262* (2013.01); *G06F 1/3265* (2013.01); *H04M 1/72577* (2013.01); *H04M 1/72597* (2013.01); *Y02B 60/1242* (2013.01)

(58) Field of Classification Search
CPC ............ H04W 12/08; H04M 1/72597; H04M 1/72577; Y02B 60/1242; G06F 1/3206; G06F 1/3262; G06F 1/3265
USPC ..................................... 455/418, 420
See application file for complete search history.

(56) References Cited

U.S. PATENT DOCUMENTS 7,302,280 B2 * 11/2007 Hinckley et al. ............... 455/567
7,372,452 B2 *  5/2008 Park ............................. 345/158
(Continued)

FOREIGN PATENT DOCUMENTS

CN      101325775 A    12/2008
CN      101800790 A     8/2010
WO     2010/050154 A1   5/2010

OTHER PUBLICATIONS

International Search Report issued in PCT/CN2012/080776 mailed on Nov. 15, 2012 (3 pages).
(Continued)

*Primary Examiner* — Mahendra Patel
(74) *Attorney, Agent, or Firm* — Osha Liang LLP

(57) ABSTRACT

An electronic terminal includes at least one input and output unit. The electronic terminal further includes: a communication detection unit configured to detect whether a communication event exists, so as to obtain a first detection result; a condition sensing unit configured to detect whether a prohibition condition for prohibiting an input and output function of the at least one input and output unit is satisfied, so as to obtain a second detection result; a prohibition unit configured to prohibit a part of the input and output function of the at least one input and output unit which is unrelated to the communication event, when the first detection result indicates that the communication event exists and the second detection result indicates that the prohibition condition is satisfied.

16 Claims, 10 Drawing Sheets

(51) Int. Cl.
   *G06F 1/32*     (2006.01)
   *H04M 1/725*    (2006.01)

(56) References Cited

U.S. PATENT DOCUMENTS

| | | | |
|---|---|---|---|
| 7,646,315 B2 * | 1/2010 | Matteo et al. | 341/22 |
| 7,884,807 B2 * | 2/2011 | Hovden et al. | 345/173 |
| 2002/0080132 A1 * | 6/2002 | Dai et al. | 345/212 |
| 2007/0259685 A1 * | 11/2007 | Engblom et al. | 455/550.1 |
| 2008/0051153 A1 * | 2/2008 | Kang | 455/566 |
| 2008/0068348 A1 * | 3/2008 | Rosenberg et al. | 345/173 |
| 2009/0262078 A1 * | 10/2009 | Pizzi | 345/169 |
| 2014/0220959 A1 * | 8/2014 | Mao et al. | 455/418 |

OTHER PUBLICATIONS

Written Opinion of the International Searching Authority issued in PCT/CN2012/080776 mailed on Nov. 15, 2012 (9 pages).

* cited by examiner

ELECTRONIC TERMINALS AND CONTROL METHODS THEREOF

CROSS REFERENCE TO RELATED APPLICATIONS

This is a national stage application based on PCT/CN2012/080776, filed on Aug. 30, 2012, which claims priority to Chinese Patent Application No. 201110268237.4, filed on Sep. 9, 2011. This application claims the priority of these prior applications and incorporates their disclosures by reference in their entireties.

TECHNICAL FIELD

Embodiments of the present invention relate to a field of electronic terminal techniques, and particularly, to electronic terminals and control methods thereof.

BACKGROUND

When an electronic terminal with a touch screen (e.g. a touch-screen mobile phone) is placed in a pocket or a bag and a communication event exists in the electronic terminal (e.g. a call incomes or a SMS is received), the touch screen may probably generate a misoperation due to a touch by a shield such as a human body or a bag body, i.e. to automatically trigger an answer function, or to automatically trigger a handup function, and thus cause a waste of power consumption of the electronic terminal. Additionally, other applications in the electronic terminal may also probably be started, e.g., a web-surfing function may be started, due to the misoperation on the touch screen. This will cause unnecessary loss of network traffic or costs. On the other hand, this will waste battery power of the electronic terminal.

SUMMARY OF INVENTION

Due to the above, embodiments of the present invention provide electronic terminals and control methods thereof, which can reduce power consumption of the electronic terminal.

In order to solve the problem as discussed above, an embodiment of the present invention provides an electronic terminal, including: a touch sensing unit having a touch sensing region; a communication detection unit configured to detect whether a communication event exists, so as to obtain a first detection result; a condition sensing unit configured to detect whether a prohibition condition for prohibiting an input function of the touch sensing unit is satisfied, so as to obtain a second detection result; a prohibition unit configured to prohibit the input function of the touch sensing unit, when the first detection result indicates that the communication event exists and the second detection result indicates that the prohibition condition is satisfied.

Alternatively, the condition sensing unit includes: an approach sensing unit having a detection region which at least partly overlaps with the touch sensing region, the approach sensing unit configured to detect whether there is an object located in the detection region; a first generating unit, configured to obtain the second detection result indicating that the prohibition condition is satisfied, when the approach sensing unit detects that there is an object located in the detection region.

Alternatively, the condition sensing unit includes: a brightness sensing unit configured to detect whether surrounding brightness is lower than a preset threshold; a second generating unit configured to obtain the second detection result indicating that the prohibition condition is satisfied, when the brightness sensing unit detects that the surrounding brightness is lower than the preset threshold.

Alternatively, the electronic terminal further includes: a time determination unit configured to detect whether a current time period belongs to a preset time period; wherein the second generating unit is further configured to obtain the second detection result indicating that the prohibition condition is satisfied, when the brightness sensing unit detects that the surrounding brightness is lower than the preset threshold, and the time determination unit determines that the current time period belongs to the preset time period.

Alternatively, the condition sensing unit includes: a hold sensing unit configured to detect whether the electronic terminal is held; a third generating unit, configured to obtain the second detection result indicating that the prohibition condition is satisfied, when the hold sensing unit detects that the electronic terminal is not held.

Alternatively, the condition sensing unit includes: a hold sensing unit configured to detect whether the electronic terminal is held; a brightness sensing unit configured to detect whether surrounding brightness is lower than a preset threshold; a fourth generating unit configured to obtain the second detection result indicating that the prohibition condition is satisfied, when the hold sensing unit detects that the electronic terminal is not held and the brightness sensing unit detects that the surrounding brightness is lower than the preset threshold.

Alternatively, the electronic terminal further includes: a processing unit configured to perform a corresponding touch-control instruction according to a touch input detected by the touch sensing unit; wherein the prohibition unit is further configured to prohibit the input function of the touch sensing unit by prohibiting the touch sensing unit from detecting the touch input and/or prohibiting the processing unit from executing the touch-control instruction, when the first detection result indicates that the communication event exists and the second detection result indicates that the prohibition condition is satisfied.

Alternatively, the electronic terminal further includes: an enablement unit, configured to enable the input function of the touch sensing unit, when the second detection result is switched from indicating that the prohibition condition is satisfied to indicating that the prohibition condition is not satisfied.

An embodiment of the present invention further provides an electronic terminal, including: a display screen having a display region; a communication detection unit configured to detect whether a communication event exists, so as to obtain a first detection result; a condition sensing unit configured to detect whether a prohibition condition for disabling backlight of the display screen is satisfied, so as to obtain a second detection result; a prohibition unit configured to prohibit disabling the backlight of the display screen, when the first detection result indicates that the communication event exists and the second detection result indicates that the prohibition condition is satisfied.

Alternatively, the condition sensing unit includes: an approach sensing unit having a detection region which at least partly overlaps with the touch sensing region, the approach sensing unit configured to detect whether there is an object located in the detection region; a first generating unit configured to obtain the second detection result indicating that the prohibition condition is satisfied, when the approach sensing unit detects that there is an object located in the detection region.

Alternatively, the condition sensing unit includes: a brightness sensing unit configured to detect whether surrounding brightness is lower than a preset threshold; a second generating unit configured to obtain the second detection result indicating that the prohibition condition is satisfied, when the brightness sensing unit detects that the surrounding brightness is lower than the preset threshold.

Alternatively, the electronic terminal further includes: a time determination unit, configured to detect whether a current time period belongs to a preset time period; wherein the second generating unit is further configured to obtain the second detection result indicating that the prohibition condition is satisfied, when the brightness sensing unit detects that the surrounding brightness is lower than the preset threshold, and the time determination unit determines that the current time period belongs to the preset time period.

Alternatively, the condition sensing unit includes: a hold sensing unit configured to detect whether the electronic terminal is held; a third generating unit configured to obtain the second detection result indicating that the prohibition condition is satisfied, when the hold sensing unit detects that the electronic terminal is not held.

Alternatively, the condition sensing unit includes: a hold sensing unit configured to detect whether the electronic terminal is held; a brightness sensing unit configured to detect whether surrounding brightness is lower than a preset threshold; a fourth generating unit configured to obtain the second detection result indicating that the prohibition condition is satisfied, when the hold sensing unit detects that the electronic terminal is not held and the brightness sensing unit detects that the surrounding brightness is lower than the preset threshold.

Alternatively, the electronic terminal further includes: a prompt unit configured to output prompt information when the first detection result indicates that the communication event exists and the second detection result indicates that the prohibition condition is satisfied.

Alternatively, the electronic terminal further includes:
an enablement unit configured to enable the backlight of the display screen, when the first detection result indicates that the communication event exists and the second detection result is switched from indicating that the prohibition condition is satisfied to indicating that the prohibition condition is not satisfied.

An embodiment of the present invention further provides a touch control method used in an electronic terminal, the electronic terminal including a touch sensing unit having a touch sensing region, the method including steps of: detecting whether a communication event exists, so as to obtain a first detection result; detecting whether a prohibition condition for prohibiting an input function of the touch sensing unit is satisfied, so as to obtain a second detection result; prohibiting the input function of the touch sensing unit, when the first detection result indicates that the communication event exists and the second detection result indicates that the prohibition condition is satisfied.

Alternatively, the step of detecting whether the prohibition condition for prohibiting the input function of the touch sensing unit is satisfied so as to obtain the second detection result includes: detecting whether there is an object located in the detection region which at least partly overlaps with the touch sensing region; obtaining the second detection result indicating that the prohibition condition is satisfied, when it is detected that there is an object located in the detection region.

Alternatively, the step of detecting whether the prohibition condition for prohibiting the input function of the touch sensing unit is satisfied so as to obtain the second detection result includes: detecting whether surrounding brightness is lower than a preset threshold; obtaining the second detection result indicating that the prohibition condition is satisfied, when it is detected that the surrounding brightness is lower than the preset threshold.

Alternatively, the step of detecting whether the prohibition condition for prohibiting the input function of the touch sensing unit is satisfied so as to obtain the second detection result includes: detecting whether surrounding brightness is lower than a preset threshold; detecting whether a current time period belongs to a preset time period, when it is detected that the surrounding brightness is lower than the preset threshold; obtaining the second detection result indicating that the prohibition condition is satisfied, when the current time period belongs to the preset time period.

Alternatively, the step of detecting whether the prohibition condition for prohibiting the input function of the touch sensing unit is satisfied so as to obtain the second detection result includes: detecting whether the electronic terminal is held; obtaining the second detection result indicating that the prohibition condition is satisfied, when it is detected that the electronic terminal is not held.

Alternatively, the step of detecting whether the prohibition condition for prohibiting the input function of the touch sensing unit is satisfied so as to obtain the second detection result includes: detecting whether the electronic terminal is held; detecting whether surrounding brightness is lower than a preset threshold when it is detected that the electronic terminal is not held; obtaining the second detection result indicating that the prohibition condition is satisfied, when it is detected that the surrounding brightness is lower than the preset threshold.

Alternatively, after the step of detecting whether the prohibition condition for prohibiting the input function of the touch sensing unit is satisfied so as to obtain the second detection result, the method further includes: enabling the input function of the touch sensing unit, when the second detection result is switched from indicating that the prohibition condition is satisfied to indicating that the prohibition condition is not satisfied.

An embodiment of the present invention further provides a method of controlling backlight of a display screen used in an electronic terminal, the electronic terminal having the display screen with a display region, the method including steps of: detecting whether a communication event exists, so as to obtain a first detection result; detecting whether a prohibition condition for disabling the backlight of the display screen is satisfied, so as to obtain a second detection result; disabling the backlight of the display screen, when the first detection result indicates that the communication event exists and the second detection result indicates that the prohibition condition is satisfied.

Alternatively, the step of detecting whether the prohibition condition for disabling the backlight of the display screen is satisfied so as to obtain the second detection result includes: detecting whether there is an object located in the detection region which at least partly overlaps with the touch sensing region; obtaining the second detection result indicating that the prohibition condition is satisfied, when it is detected that there is an object located in the detection region.

Alternatively, the step of detecting whether the prohibition condition for disabling backlight of the display screen is satisfied so as to obtain the second detection result includes: detecting whether surrounding brightness is lower than a preset threshold; obtaining the second detection result indicating that the prohibition condition is satisfied, when it is detected that the surrounding brightness is lower than the preset threshold.

Alternatively, the step of detecting whether the prohibition condition for disabling the backlight of the display screen is satisfied so as to obtain the second detection result includes: detecting whether surrounding brightness is lower than a preset threshold; detecting whether a current time period belongs to a preset time period, when it is detected that the surrounding brightness is lower than the preset threshold; obtaining the second detection result indicating that the prohibition condition is satisfied, when the current time period belongs to the preset time period.

Alternatively, the step of detecting whether the prohibition condition for disabling the backlight of the display screen is satisfied so as to obtain the second detection result includes: detecting whether the electronic terminal is held; obtaining the second detection result indicating that the prohibition condition is satisfied, when it is detected that the electronic terminal is not held.

Alternatively, the step of detecting whether the prohibition condition for disabling the backlight of the display screen is satisfied so as to obtain the second detection result includes: detecting whether the electronic terminal is held; detecting whether surrounding brightness is lower than a preset threshold, when it is detected that the electronic terminal is not held; obtaining the second detection result indicating that the prohibition condition is satisfied, when it is detected that the surrounding brightness is lower than the preset threshold.

Alternatively, the method of controlling backlight of the display screen further includes: outputting prompt information when the first detection result indicates that the communication event exists and the second detection result indicates that the prohibition condition is satisfied.

Alternatively, the method of controlling backlight of the display screen further includes: enabling the backlight of the display screen, when the first detection result indicates that the communication event exists and the second detection result is switched from indicating that the prohibition condition is satisfied to indicating that the prohibition condition is not satisfied.

The above schemes have advantages as follows:

When the communication event exists in the electronic terminal, and the touch sensing unit of the electronic terminal is possible to be misoperated (e.g. when the electronic terminal is placed in the pocket or bag), the input function of the touch sensing unit is prohibited, preventing the misoperation of the touch sensing unit caused by being touched by the shield such as the human body or the bag body. This may avoid unnecessary lost of the network traffic or the costs, and on the other hand, the power consumption of the electronic terminal may also be reduced to save the battery power of the electronic terminal.

When the communication event exists in the electronic terminal, and the user cannot see a display prompt on the display screen (e.g. when the electronic terminal is placed in the pocket or bag), the backlight of the display screen of the electronic terminal may be prohibited, so as to efficiently reduce the power consumption of the electronic terminal and to save the battery power of the electronic terminal.

DETAILED DESCRIPTION

Hereinafter, implementations of the present invention may be further described in detail with reference to the drawings and the embodiments.

An embodiment of the present invention provides an electronic terminal with a touch sensing unit (e.g. a touch screen, a touch panel etc.). When there is a communication event (e.g. a call incomes, a SMS is received, an email is received, etc.) in the electronic terminal, it is required to determine whether the touch sensing unit is possible to be misoperated. For example, when the electronic terminal is placed in the pocket or the bag, the touch sensing unit may possibly generate the misoperation caused by touch of the human body or the bag body. When it is determined that the touch sensing unit is possible to be misoperated, the input function of the touch sensing unit may be prohibited. This may avoid unnecessary lost of the network traffic or the costs. On the other hand, the power consumption of the electronic terminal may also be reduced to save the battery power of the electronic terminal.

Figure 1:
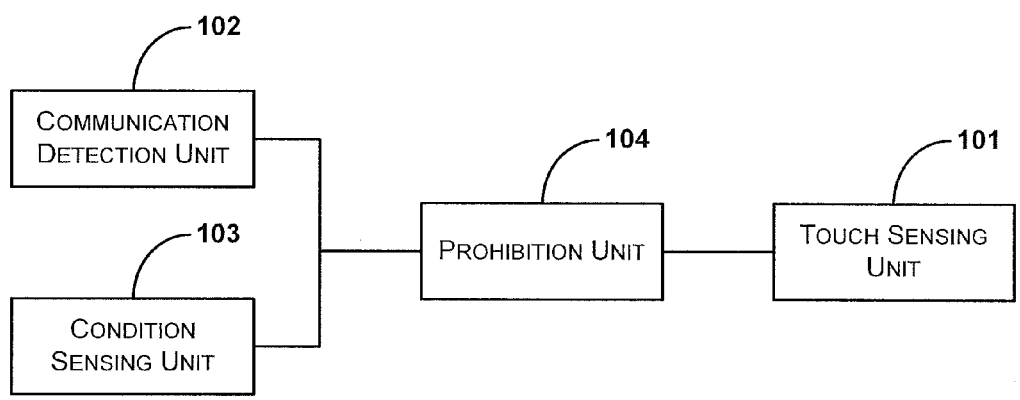
FIG. 1 is a structural diagram schematically showing an electronic terminal according to an embodiment of the present invention.

FIG. 1 is a structural diagram schematically showing the electronic terminal according to the embodiment of the present invention. The electronic terminal may include:

a touch sensing unit 101 configured to detect whether an touch input exists, wherein the touch sensing unit 101 may be the touch screen or the touch panel etc. and may have a touch sensing region;

a communication detection unit 102, configured to detect whether a communication event exists, so as to obtain a first detection result, wherein the communication event may be a call incoming, a SMS being received, and an email being received etc.;

a condition sensing unit 103 configured to detect whether a prohibition condition for prohibiting an input function of the touch sensing unit 101 is satisfied, so as to obtain a second detection result, i.e., detecting whether the touch sensing unit 101 is possible to be misoperated;

a prohibition unit 104 configured to prohibit the input function of the touch sensing unit 101, when the first detection result indicates that the communication event exists and the second detection result indicates that the prohibition condition is satisfied.

In the embodiment as described above, the condition sensing unit 103 may be kept turning on after the electronic terminal is powered up; and may also be turned on once the communication detection unit 102 detects that the communication event occurs, so as to save the power consumption of the electronic terminal.

The condition sensing unit 103 as described above may be various types of sensing units, which may be illustrated by examples.

First Embodiment

If the electronic terminal is placed in the user's pocket, bag or other objects, the touch sensing unit may possibly generate the misoperation caused by touch of the shield such as the human body or the bag body, when the communication event occurs. Due to this, the condition sensing unit 103 in the embodiment of the present invention may detect whether there is a shield near the touch sensing unit. If it is detected that there is the shield near the touch sensing unit, the input function of the touch sensing unit is prohibited, so as to prevent the touch sensing unit from being misoperated.

Based on the above description, the condition sensing unit 103 may include: an approach sensing unit and a first generating unit. The approach sensing unit may be an approach sensor arranged near the touch sensing unit. The approach sensing unit has a detection region which at least partly overlaps with the touch sensing region of the touch sensing unit. The approach sensing unit may be configured to detect whether there is an object located in the detection region. The first generating unit may be configured to obtain the second detection result indicating that the prohibition condition is satisfied, when the approach sensing unit detects that there is an object located in the detection region.

The approach sensing unit is arranged at a position on the electronic terminal. It is required to ensure that the detection region of the approach sensing unit is partly or wholly overlapped with the touch sensing region of the touch sensing unit.

For example, the electronic terminal is a mobile phone with a touch screen. The approach sensing unit may be arranged at a side where the touch screen of the electronic terminal is located, e.g. arranged over the touch screen. When the communication event exists in the electronic terminal, all of function keys which are generally used for answering the call or viewing the SMS may be displayed on a lower part of the touch screen. In order to avoid the effect on the user's normal answering the call or viewing the SMS, the detection region of the approach sensing unit may be overlapped with an upper part of the touch sensing region of the touch screen. Generally, the user would not touch the upper part of the touch sensing region when he answers the call or views the SMS normally. That is, when some object approaches the upper part of the touch sensing region, the approach sensing unit may detect the object. At this time, the input function of the touch sensing unit may be prohibited. When some object approaches the lower part of the touch sensing region, e.g., when the user touches the lower part of the touch sensing region by his finger, the approach sensing unit cannot detect the object, and cannot prohibit the input function of the touch sensing unit. Thus, the user's normal use of the touch sensing unit may not be affected.

The detection region of the approach sensing unit and the touch sensing region of the touch screen may be wholly overlapped. As such, in order to avoid the effect on the user's normal use of the touch sensing unit, the approach sensing unit in the embodiment of the present invention may further decide an area of the object approaching the detection region thereof. When it is detected that the object (e.g. the bag body) whose area is larger than a preset threshold is located in the detection region, a detection result indicating that the object is located in the detection region may be obtained. At this time, the electronic terminal may prohibit the input function of the touch sensing unit. When it is detected that the object (e.g. the finger) whose area is not larger than the preset threshold is located in the detection region, a detection result indicating that the object is not located in the detection region may be obtained. At this time, the electronic terminal does not prohibit the input function of the touch sensing unit. Thus, the user's normal touch-control operation on the touch sensing unit may not be affected.

Second Embodiment

When the electronic terminal is located in the user's pocket or in the bag and is shielded, brightness of the surrounding light may generally be lower. Thus, the condition sensing unit 103 in the embodiment of the present invention may detect whether the brightness of the surrounding light is lower than a preset threshold. When the communication event exists and it is detected that the brightness of the surrounding light is lower than the preset threshold, the input function of the touch sensing unit may be prohibited to prevent the misoperation of the touch sensing unit.

Based on the above description, the condition sensing unit 103 may include a brightness sensing unit and a second generating unit. The brightness sensing unit may be a brightness sensor configured to detect whether the surrounding brightness is lower than the preset threshold. The second generating unit is configured to obtain the second detection result indicating that the prohibition condition is satisfied, when the brightness sensing unit detects that the surrounding brightness is lower than the preset threshold.

Then, the low brightness of the surrounding light may not necessarily mean that the touch sensing unit of the electronic terminal is shielded. For example, in a case that light is lower at night, the brightness of the surrounding light of the electronic terminal may probably be lower than the preset threshold. At this time, if the existence of the communication event is detected and the brightness of the surrounding light is lower than the preset threshold, the input function of the touch sensing unit is prohibited. Then, the user's normal use will be affected.

In order to avoid the above problem, the electronic terminal of the embodiment of the present invention may further include a time determination unit configured to detect whether a current time period belongs to a preset time period. The preset time period may refer to a daytime period. A starting time and an ending time of the preset time period may be set as required. For example, the starting time is 6:00, and the ending time is 18:00. Here, the second generating unit may further be configured to obtain the second detection result indicating that the prohibition condition is satisfied, when the brightness sensing unit detects that the surrounding brightness is lower than the preset threshold, and the time determination unit determines that the current time period belongs to the preset time period.

Third Embodiment

When the electronic terminal is held by the user, it generally shows that the user needs to perform an operation, e.g., a touch-control operation, on the electronic terminal. When the electronic terminal is held by the user, it generally shows that the user does not need to perform an operation on the electronic terminal. In the embodiment of the present invention, the condition sensing unit 103 may detect whether the electronic terminal is held. When it is detected that the electronic terminal is held, the input function of the touch sensing unit is prohibited.

Based on the above description, the condition sensing unit 103 may include a hold sensing unit and a third generating unit. The hold sensing unit is configured to detect whether the electronic terminal is held. The third generating unit is configured to obtain the second detection result indicating that the prohibition condition is satisfied when the hold sensing unit detects that the electronic terminal is not held.

The sensor of the hold sensing unit is generally arranged at a position, where the user may hold when he normally uses the electronic terminal, on a housing surrounding the touch sensing unit.

Fourth Embodiment

In the embodiment of the present invention, the condition sensing unit 103 may further include both a hold sensing unit and a brightness sensing unit. Furthermore, the condition sensing unit 103 may include a fourth generating unit configured to obtain the second detection result indicating that the prohibition condition is satisfied, when the hold sensing unit detects that the electronic terminal is not held and the brightness sensing unit detects that the surrounding brightness is lower than the preset threshold.

Besides the touch sensing unit configured to detect the touch input, the electronic terminal of the embodiment of the present invention may further need a processing unit configured to perform a corresponding touch-control instruction according to a touch input detected by the touch sensing unit. The prohibition unit in the embodiment of the present invention may prohibit the input function of the touch sensing unit by prohibiting the touch sensing unit from detecting the touch input and/or prohibiting the processing unit from executing the touch-control instruction, when the first detection result indicates that the communication event exists and the second detection result indicates that the prohibition condition is satisfied.

As mentioned in the above embodiment, when the communication event exists and it is detected that the input function of the touch sensing unit being prohibited is currently satisfied (e.g., the electronic terminal is placed in the pocket), the input function of the touch sensing unit is needed to be prohibited, so as to prevent the misoperation of the touch sensing unit. When it is detected that the input function of the touch sensing unit being prohibited is not satisfied currently (e.g., the electronic terminal is taken out from the pocket), the input function of the touch sensing unit may be enabled at this time, in order not to affect the user's normal use of the touch sensing unit. Therefore, the electronic terminal of the embodiment of the present invention may further include an enablement unit configured to enable the input function of the touch sensing unit, when the first detection result indicates that the communication event exists, and the second detection result is switched from indicating that the prohibition condition is satisfied to indicating that the prohibition condition is not satisfied.

The enablement unit as described above may enable the input function of the touch sensing unit when the communication event exists and the prohibition condition for prohibiting the input function of the touch sensing unit is not satisfied currently. Of course, it may be understood that even if the communication event has already not existed currently, e.g., the incoming call has ended when the electronic terminal is taken out from the pocket by the user, the enablement unit needs to enable the input function of the touch sensing unit, in order not to affect the user's normal use of the touch sensing unit. That is, the enablement unit may enable the input function of the touch sensing unit, as long as the second detection result is switched from indicating that the prohibition condition is satisfied to indicating that the prohibition condition is not satisfied.

When the condition sensing unit includes the approach sensing unit, the prohibition condition for prohibiting the input function of the touch sensing unit being not satisfied means that the approach sensing unit detects that no object is located in the detection region thereof.

When the condition sensing unit includes the brightness sensing unit, the prohibition condition for prohibiting the input function of the touch sensing unit being not satisfied means that the brightness sensing unit detects that the surrounding brightness is higher than the preset threshold.

When the condition sensing unit includes the hold sensing unit, the prohibition condition for prohibiting the input function of the touch sensing unit being not satisfied means that the hold sensing unit detects that the electronic terminal is held.

Additionally, the electronic terminal in the embodiment may prompt the user to process the communication event by a prompt unit outputting prompt information such as a ring tone and/or vibration etc., when it is detected that the communication event exists and the prohibition condition for prohibiting the input function of the touch sensing unit is satisfied.

When the communication event exists in the electronic terminal as provided in the above embodiment, and the touch sensing unit of the electronic terminal is possible to be misoperated (e.g. when the electronic terminal is placed in the pocket or bag), the input function of the touch sensing unit is prohibited, preventing the misoperation of the touch sensing unit caused by being touched by the shield such as the human body or the bag body. This may avoid unnecessary lost of the network traffic or the costs, and on the other hand, the power consumption of the electronic terminal may also be reduced to save the battery power of the electronic terminal.

The embodiment of the present invention further provides an electronic terminal, which needs to determine whether the user can see a display prompt of the display screen when the communication event exists (a call incoming, a SMS being received, an email being received etc.). For example, when the electronic terminal is placed in the user's pocket or bag, it illustrates that the user cannot see the display prompt of the display screen. When it is determined that the user cannot see the display prompt of the display screen, backlight of the display screen is disabled, so as to efficiently reduce the power consumption of the electronic terminal to save the battery power of the electronic terminal.

Figure 2:
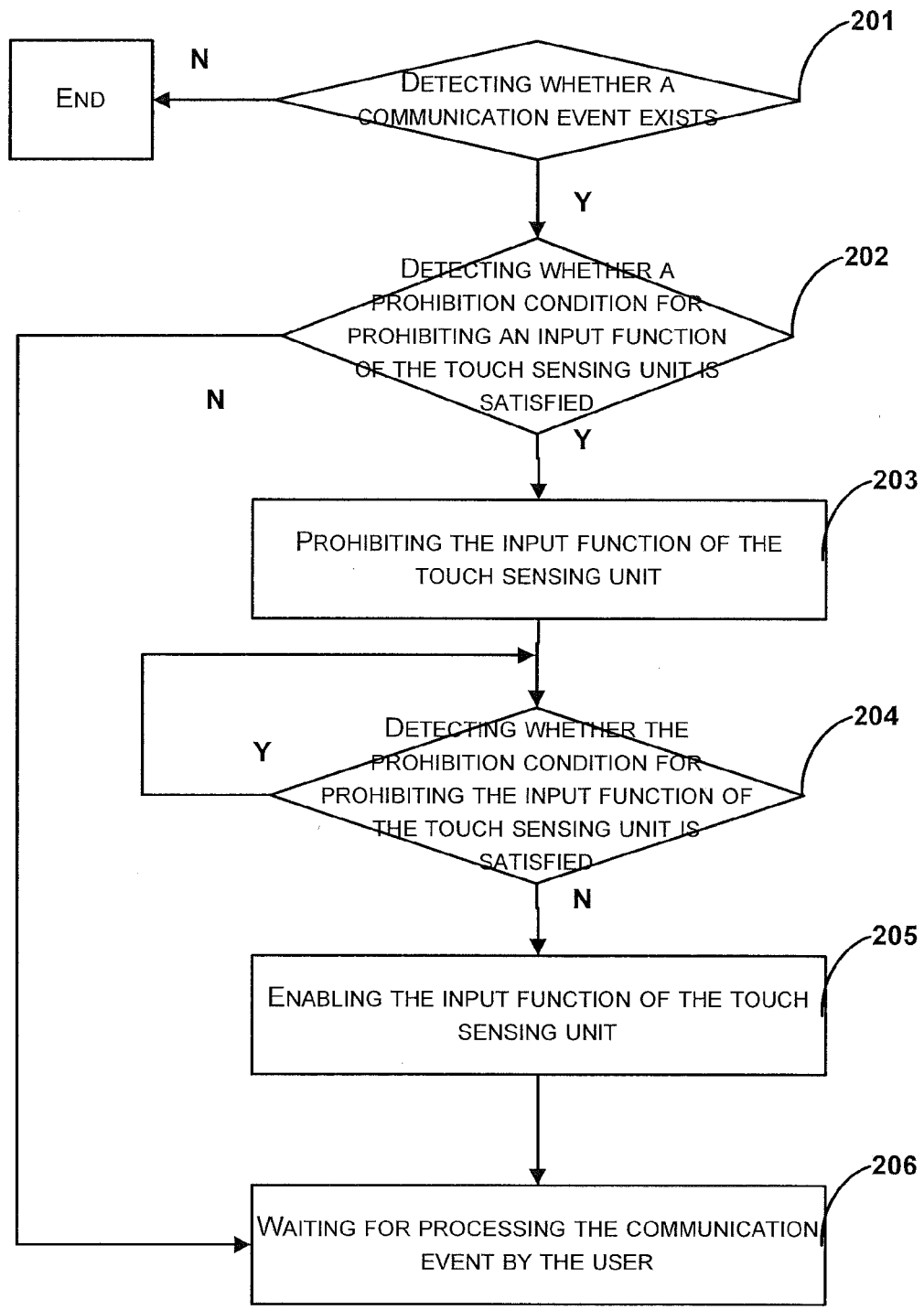
FIG. 2 is a flowchart schematically showing a touch control method according to an embodiment of the present invention.

As shown in FIG. 2, an embodiment of the present invention further provides a touch control method used in an electronic terminal, the electronic terminal including a touch sensing unit having a touch sensing region, the method including:

Step 201, detecting whether the communication event exists. If so, the method proceeds to step 202; otherwise, the method is ended.

Step 202, detecting whether the prohibition condition for prohibiting the input function of the touch sensing unit is satisfied. If so, the method proceeds to step 203; otherwise, the method proceeds to step 206.

Step 203, prohibiting the input function of the touch sensing unit.

Step 204, detecting whether the prohibition condition for prohibiting the input function of the touch sensing unit is satisfied. If so, the method proceeds to make further detection; otherwise, the method proceeds to step 205.

Step 205, enabling the input function of the touch sensing unit.

Step 206, waiting for processing the communication event by the user.

In the above step 204, the electronic terminal may detect whether the prohibition condition for prohibiting the input function of the touch sensing unit is satisfied by various methods. Hereinafter, it will be described by examples.

Figure 3:
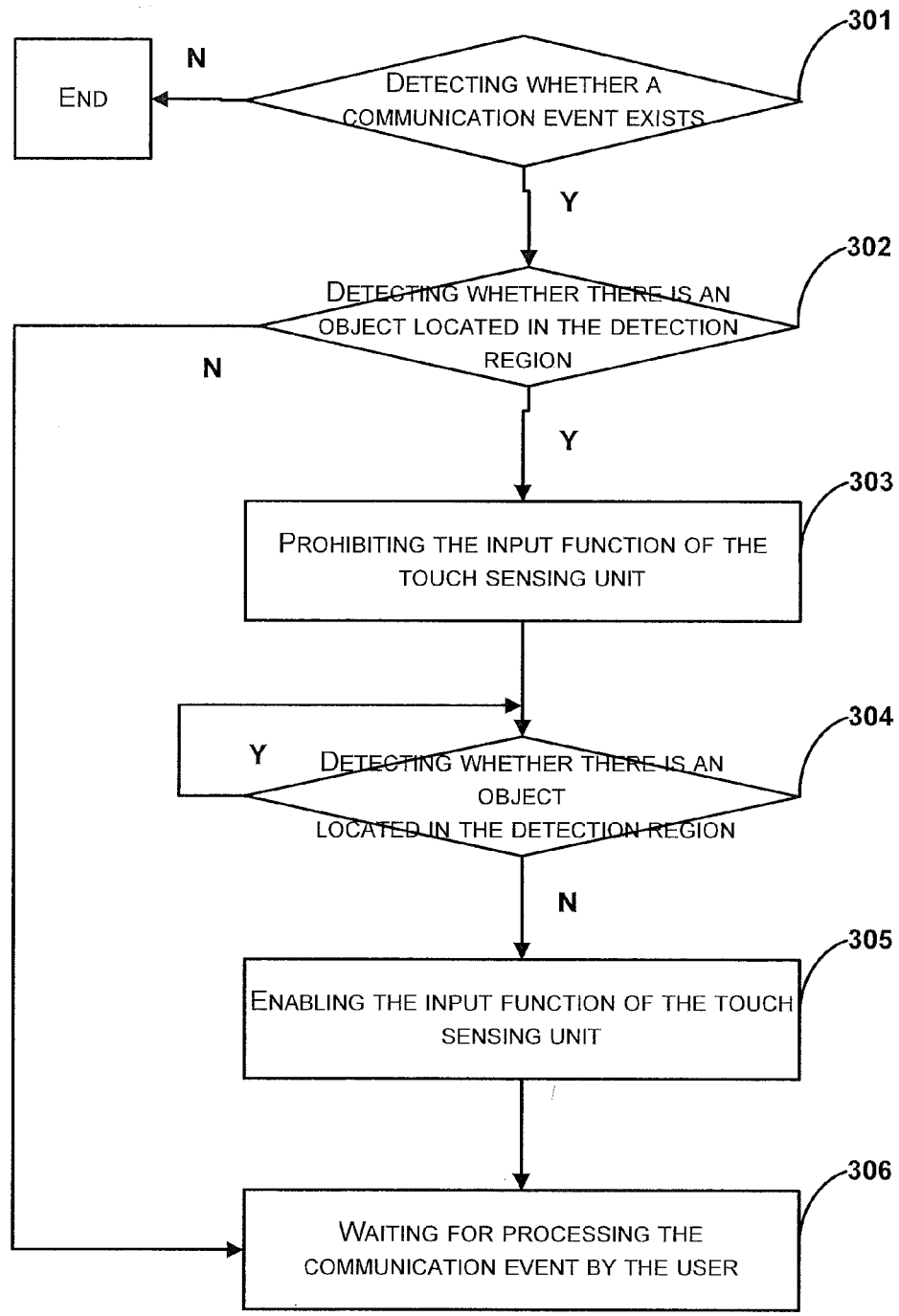
FIG. 3 is another flowchart schematically showing a touch control method according to an embodiment of the present invention.

FIG. 3 is another flowchart schematically showing a touch control method according to an embodiment of the present invention. The touch control method is used in an electronic terminal, the electronic terminal including a touch sensing unit having a touch sensing region, the method including:

Step 301, detecting whether the communication event exists. If so, the method proceeds to step 302; otherwise, the method is ended.

Step 302, detecting whether there is an object located in the detection region, the detection region being at least partly overlapped with the touch sensing region. If so, the method proceeds to step 303; otherwise, the method proceeds to step 306.

Step 303, prohibiting the input function of the touch sensing unit.

Step 304, detecting whether there is an object located in the detection region. If so, the method proceeds to make further detection; otherwise, the method proceeds to step 305.

Step 305, enabling the input function of the touch sensing unit.

Step 306, waiting for processing the communication event by the user.

Figure 4:
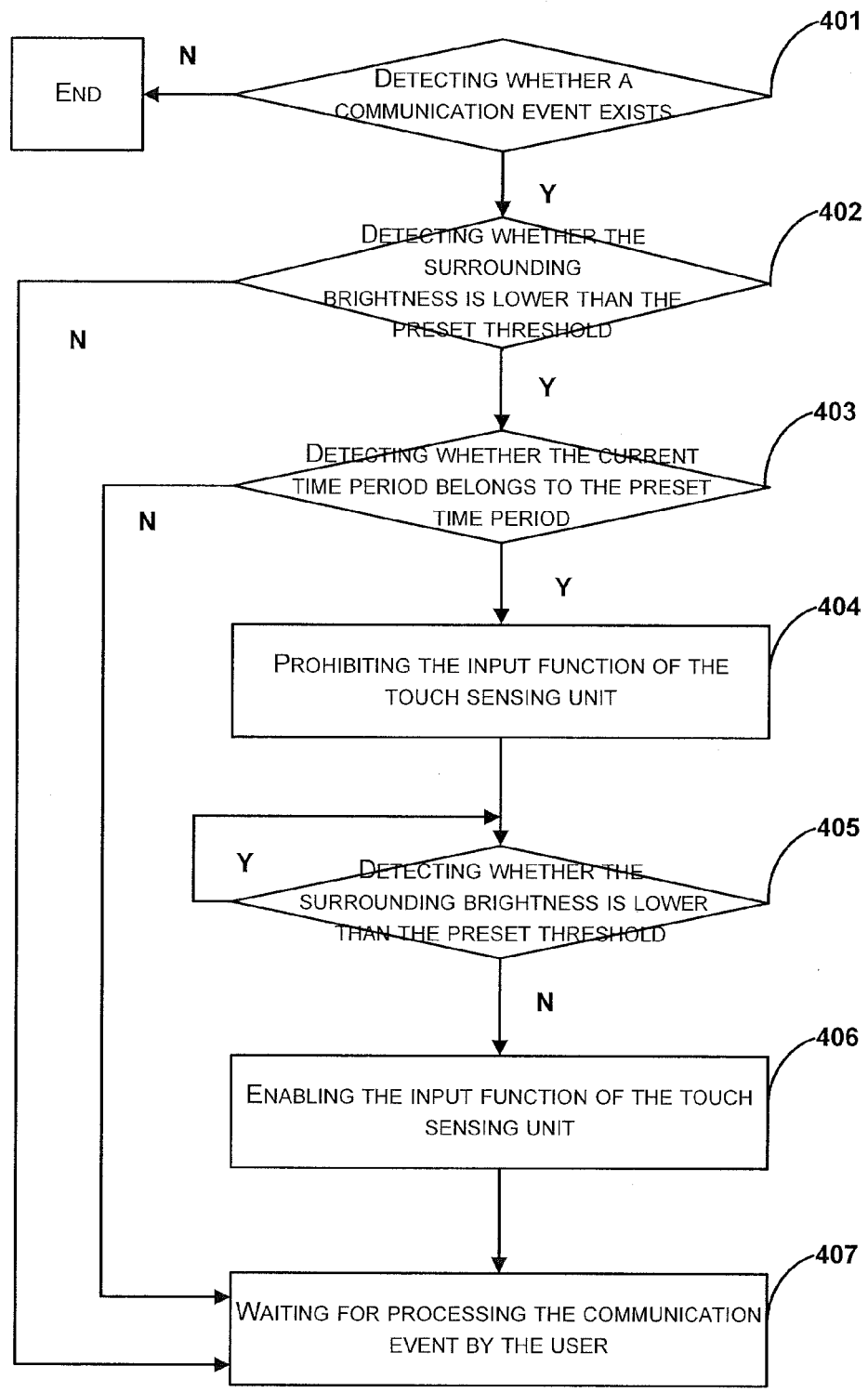
FIG. 4 is yet another flowchart schematically showing a touch control method according to an embodiment of the present invention.

FIG. 4 is yet another flowchart schematically showing a touch control method according to an embodiment of the present invention. The touch control method is used in an electronic terminal, the electronic terminal including a touch sensing unit having a touch sensing region, the method including:

Step 401, detecting whether the communication event exists. If so, the method proceeds to step 402; otherwise, the method is ended.

Step 402, detecting whether the surrounding brightness is lower than the preset threshold. If so, the method proceeds to step 403; otherwise, the method proceeds to step 407.

Step 403, detecting whether the current time period belongs to the preset time period. If so, the method proceeds to step 404; otherwise, the method proceeds to step 407.

Step 404, prohibiting the input function of the touch sensing unit.

Step 405, of detecting whether the surrounding brightness is lower than the preset threshold. If so, the method proceeds to make further detection; otherwise, the method proceeds to step 406.

Step 406 of enabling the input function of the touch sensing unit.

Step 407, waiting for processing the communication event by the user.

Figure 5:
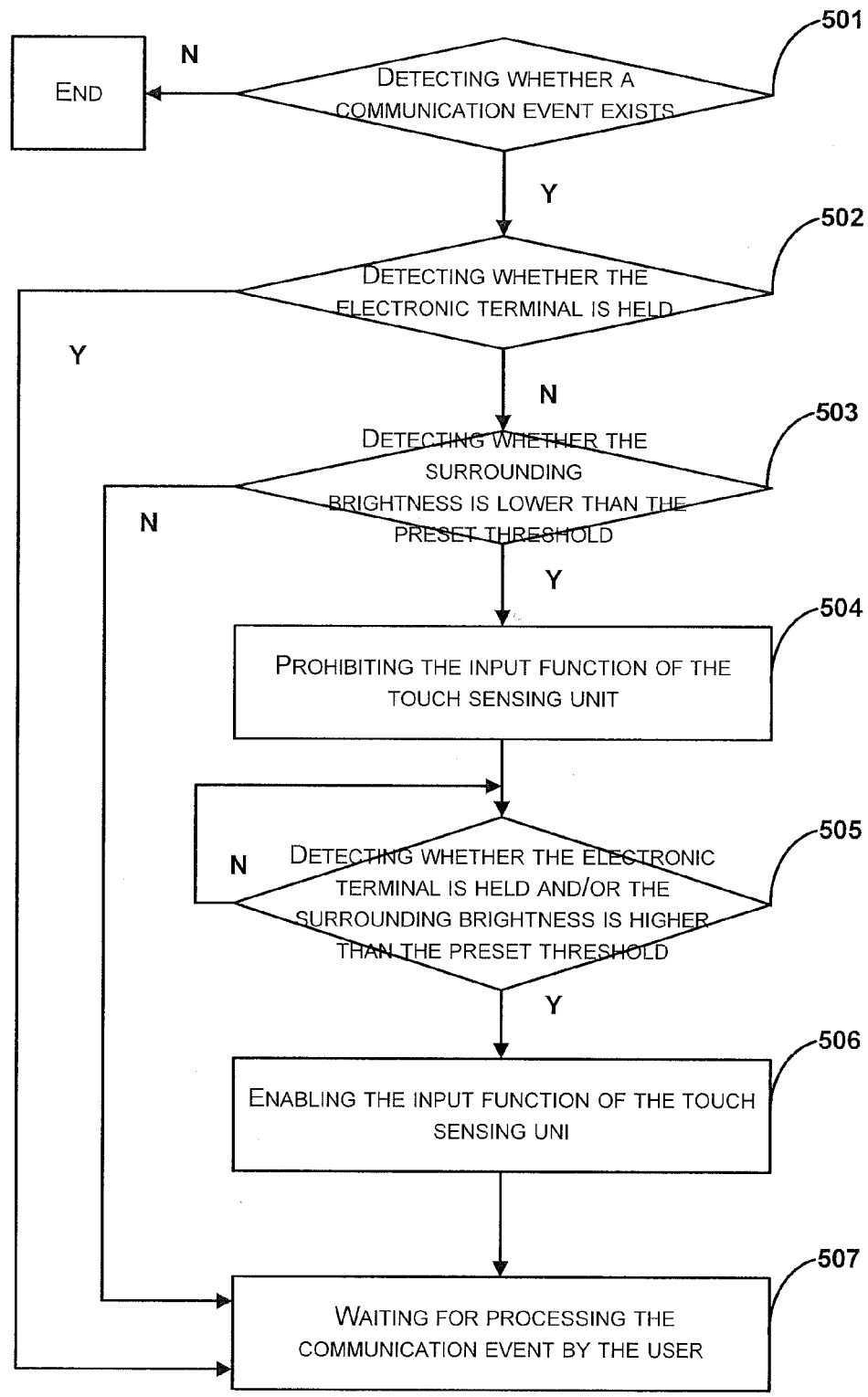
FIG. 5 is yet another flowchart schematically showing a touch control method according to an embodiment of the present invention.

FIG. 5 is yet another flowchart schematically showing a touch control method according to an embodiment of the present invention. The touch control method is used in an electronic terminal, the electronic terminal including a touch sensing unit having a touch sensing region, the method including:

Step 501, detecting whether the communication event exists. If so, the method proceeds to step 502; otherwise, the method is ended.

Step 502, detecting whether the electronic terminal is held. If so, the method proceeds to step 507; otherwise, the method proceeds to step 503.

Step 503, detecting whether the surrounding brightness is lower than the preset threshold. If so, the method proceeds to step 504; otherwise, the method proceeds to step 507.

Step 504, prohibiting the input function of the touch sensing unit.

Step 505, detecting whether the electronic terminal is held and/or the surrounding brightness is higher than the preset threshold. If so, the method proceeds to step 505; otherwise, the method proceeds to make further detection.

Step 506, enabling the input function of the touch sensing unit. That is, when it is detected that the electronic terminal is held, or it is detected that the surrounding brightness is higher than the preset threshold, or it is detected that the electronic terminal is held and the surrounding brightness is higher than the preset threshold, the input function of the touch sensing unit is enabled.

Step 507, waiting for processing the communication event by the user.

According to the touch control method as provided in the above embodiment, when the communication event exists and the touch sensing unit of the electronic terminal is possible to be misoperated (e.g. when the electronic terminal is placed in the pocket or bag), the input function of the touch sensing unit is prohibited, preventing the misoperation of the touch sensing unit caused by being touched by the shield such as the human body or the bag body. This may avoid unnecessary lost of the network traffic or the costs, and on the other hand, the power consumption of the electronic terminal may also be reduced to save the battery power of the electronic terminal.

Figure 6:
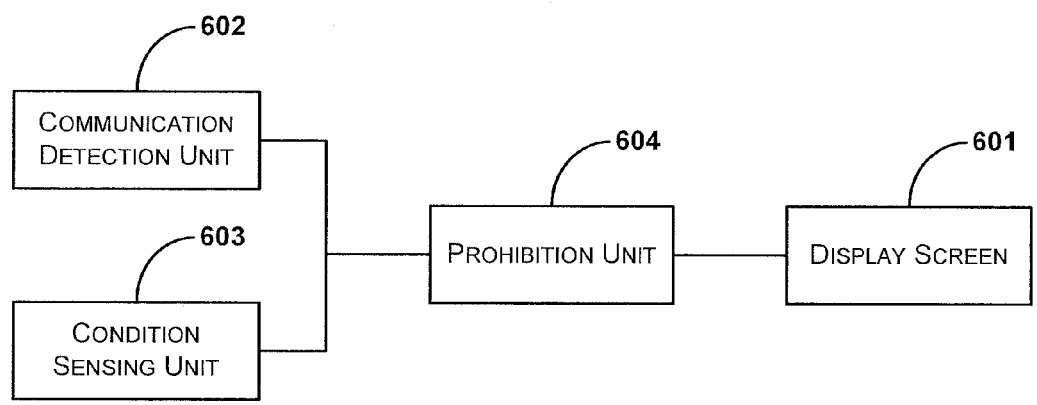
FIG. 6 is another structural diagram schematically showing an electronic terminal according to an embodiment of the present invention.

FIG. 6 is another structural diagram schematically showing an electronic terminal of the present invention. The electronic terminal may include:

a display screen 601 having a display region;

a communication detection unit 602 configured to detect whether a communication event exists, so as to obtain a first detection result, wherein the communication event may be a call incoming, a SMS being received, and an email being received etc.;

a condition sensing unit 603 configured to detect whether a prohibition condition for disabling the backlight of the display screen 601 is satisfied, so as to obtain a second detection result, i.e., determining whether the user can see the display prompt of the display screen 601;

a prohibition unit 604 configured to disable the backlight of the display screen 601, when the first detection result indicates that the communication event exists and the second detection result indicates that the prohibition condition is satisfied.

The condition sensing unit 603 as described above may be various types of sensing units, which may be illustrated by examples.

First Embodiment

If the electronic terminal is placed in the user's pocket, bag or other objects, the user cannot see the display prompt of the display screen 601, when the communication event occurs.

Due to this, the condition sensing unit 603 in the embodiment of the present invention may detect whether there is a shield for the display screen 601. If it is detected that there is a shield for the display screen 601, the display screen 601 is disabled, so as to save the battery power of the electronic terminal.

Based on the above description, the condition sensing unit 603 may include: an approach sensing unit and a first generating unit. The approach sensing unit may be an approach sensor arranged near the display screen 601. The approach sensing unit has a detection region which at least partly overlaps with the display region of the display screen 601. The approach sensing unit may be configured to detect whether there is an object located in the detection region. The first generating unit may be configured to obtain the second detection result indicating that the prohibition condition is satisfied, when the approach sensing unit detects that there is an object located in the detection region.

Second Embodiment

When the electronic terminal is located in the user's pocket or in the bag and is shielded, brightness of the surrounding light may generally be lower. Thus, the condition sensing unit 603 in the embodiment of the present invention may detect whether the brightness of the surrounding light is lower than a preset threshold. When the communication event exists and it is detected that the brightness of the surrounding light is lower than the preset threshold, the display screen 601 may be disabled to save the battery power of the electronic terminal.

Based on the above description, the condition sensing unit 603 may include a brightness sensing unit and a second generating unit. The brightness sensing unit may be a brightness sensor configured to detect whether the surrounding brightness is lower than the preset threshold. The second generating unit is configured to obtain the second detection result indicating that the prohibition condition is satisfied, when the brightness sensing unit detects that the surrounding brightness is lower than the preset threshold.

Then, the low brightness of the surrounding light may not necessarily mean that the display screen 601 is shielded. For example, in a case that light is lower at night, the brightness of the surrounding light of the electronic terminal may probably be lower than the preset threshold. Therefore, the electronic terminal of the embodiment of the present invention may further include a time determination unit configured to detect whether a current time period belongs to a preset time period. The preset time period may refer to a daytime period. A starting time and an ending time of the preset time period may be set as required. For example, the starting time is 6:00, and the ending time is 18:00. Here, the second generating unit may further be configured to obtain the second detection result indicating that the prohibition condition is satisfied, when the brightness sensing unit detects that the surrounding brightness is lower than the preset threshold, and the time determination unit determines that the current time period belongs to the preset time period.

Third Embodiment

When the electronic terminal is held by the user, it generally shows that the user may see the display prompt of the display screen. In the embodiment of the present invention, the condition sensing unit 603 may detect whether the electronic terminal is held. When it is detected that the electronic terminal is held, the backlight of the display screen 601 is disabled.

Based on the above description, the condition sensing unit 603 may include a hold sensing unit and a third generating unit. The hold sensing unit is configured to detect whether the electronic terminal is held. The third generating unit is configured to obtain the second detection result indicating that the prohibition condition is satisfied when the hold sensing unit detects that the electronic terminal is not held.

The sensor of the hold sensing unit is generally arranged at a position, where the user may hold when he normally uses the electronic terminal, on a housing surrounding the touch sensing unit.

Fourth Embodiment

In the embodiment of the present invention, the condition sensing unit 603 may further include both a hold sensing unit and a brightness sensing unit. Furthermore, the condition sensing unit 603 may include a fourth generating unit configured to obtain the second detection result indicating that the prohibition condition is satisfied, when the hold sensing unit detects that the electronic terminal is not held and the brightness sensing unit detects that the surrounding brightness is lower than the preset threshold.

As mentioned in the above embodiment, when the communication event exists and it is detected that the backlight of the display screen being disabled is currently satisfied (e.g., the electronic terminal is placed in the pocket), the backlight of the display screen is needed to be disabled. When it is detected that the backlight of the display screen being prohibited is not satisfied currently (e.g., the electronic terminal is taken out from the pocket), the display screen may be enabled. Therefore, the electronic terminal of the embodiment of the present invention may further include an enablement unit configured to enable the backlight of the display screen, when the first detection result indicates that the communication event exists, and the second detection result is switched from indicating that the prohibition condition is satisfied to indicating that the prohibition condition is not satisfied.

When the condition sensing unit includes the approach sensing unit, the prohibition condition for disabling backlight of the display screen being not satisfied means that the approach sensing unit detects that no object is located in the detection region thereof.

When the condition sensing unit includes the brightness sensing unit, the prohibition condition for disabling the backlight of the display screen being not satisfied means that the brightness sensing unit detects that the surrounding brightness is higher than the preset threshold.

When the condition sensing unit includes the hold sensing unit, the prohibition condition for disabling the backlight of the display screen being not satisfied means that the hold sensing unit detects that the electronic terminal is held.

The electronic terminal in the above embodiment may prompt the user that the communication event occurs by enabling the display screen and by a prompt unit outputting prompt information such as a ring tone and/or vibration etc., when it is detected that the communication event exists and the prohibition condition for disabling the backlight of the display screen is not satisfied. When it is detected that the communication event exists and the prohibition condition for disabling the backlight of the display screen is satisfied, the backlight of the display screen is disabled. In order to prompt the user, the electronic terminal may prompt the user that the communication event occurs by enabling the prompt unit to continue to output prompt information such as the ring tone and/or vibration etc.

The electronic terminal in the above embodiment may prompt the user that the communication event occurs only by enabling the display screen, when it is detected that the communication event exists and the prohibition condition for disabling the backlight of the display screen is not satisfied. When it is detected that the communication event exists and the prohibition condition for disabling the backlight of the display screen is satisfied, the backlight of the display screen is disabled. In order to prompt the user that the communication event occurs, the electronic terminal may prompt the user that the communication event occurs by enabling the prompt unit to output prompt information such as the ring tone and/or vibration etc.

When the communication event exists in the electronic terminal as provided in the above embodiment, and the user cannot see the display prompt of the display screen (e.g. when the electronic terminal is placed in the pocket or bag), the backlight of the display screen of the electronic terminal is enabled, so as to reduce the power consumption of the electronic terminal and to save the battery power of the electronic terminal.

Figure 7:
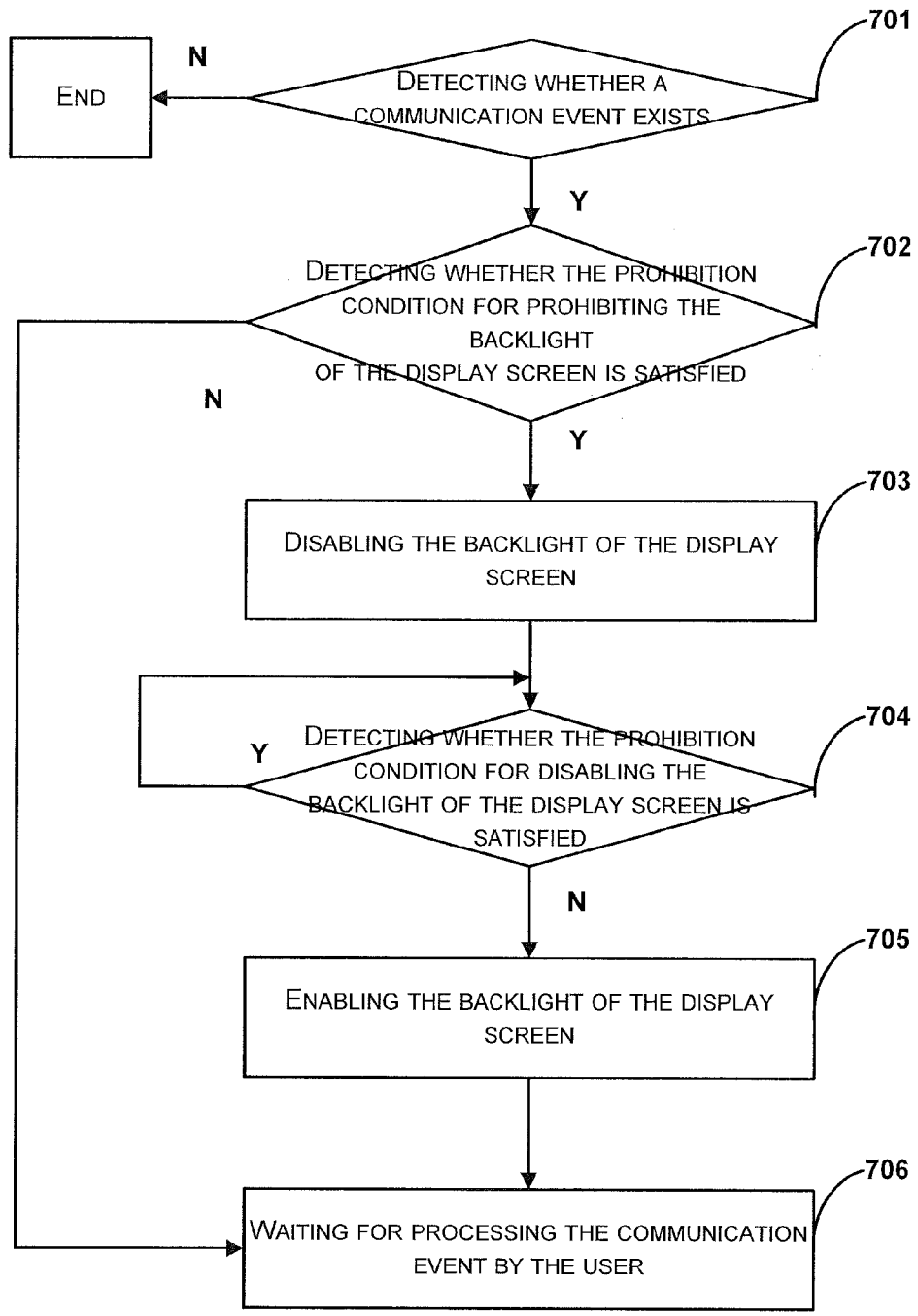
FIG. 7 is a flowchart schematically showing a display screen backlight control method according to an embodiment of the present invention.

As shown in FIG. 7, the present invention further provides a method of controlling backlight of a display screen used in an electronic terminal, the electronic terminal having the display screen with a display region, the method including steps of:

Step 701, detecting whether a communication event exists. If so, the method proceeds to step 702; otherwise, the method is ended.

Step 702, detecting whether the prohibition condition for prohibiting the backlight of the display screen is satisfied. If so, the method proceeds to step 703; otherwise, the method proceeds to step 706.

Step 703, disabling the backlight of the display screen. In addition, the ring tone and/or vibration may be output simultaneously to prompt the user that the communication event occurs.

Step 704, detecting whether the prohibition condition for disabling the backlight of the display screen is satisfied. If so, the method proceeds to make further detection; otherwise, the method proceeds to step 705.

Step 705, enabling the backlight of the display screen.

In the above step 702, the electronic terminal may detect whether the prohibition condition for disabling the backlight of the display screen is satisfied by various methods. Hereinafter, it will be described by examples.

Figure 8:
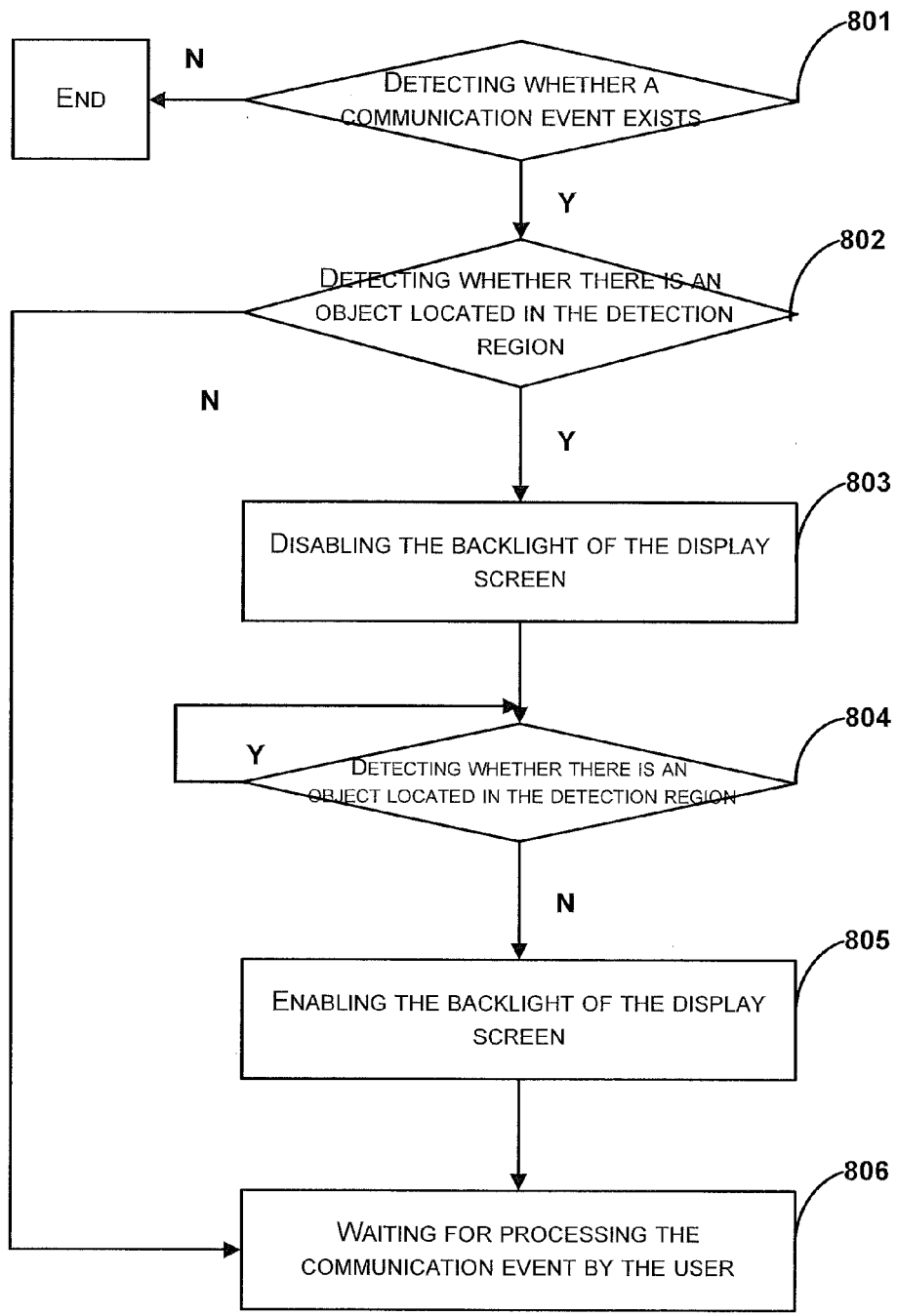
FIG. 8 is another flowchart schematically showing a display screen backlight control method according to an embodiment of the present invention.

FIG. 8 is another flowchart schematically showing a display screen backlight control method according to an embodiment of the present invention. The display screen backlight control method is used in an electronic terminal, the electronic terminal having a display screen with a display region, the method including:

Step 801, detecting whether a communication event exists. If so, the method proceeds to step 802; otherwise, the method is ended.

Step 802, detecting whether there is an object located in the detection region, the detection region being at least partly overlapped with the display region of the display screen. If so, the method proceeds to step 803; otherwise, the method proceeds to step 806.

Step 803, disabling the backlight of the display screen. In addition at the same time, the ring tone and/or vibration may be output to prompt the user that the communication event occurs.

Step 804, detecting whether there is an object located in the detection region. If so, the method proceeds to make further detection; otherwise, the method proceeds to step 805.

Step 805, enabling the backlight of the display screen.

Step 806, waiting for processing the communication event by the user.

Figure 9:
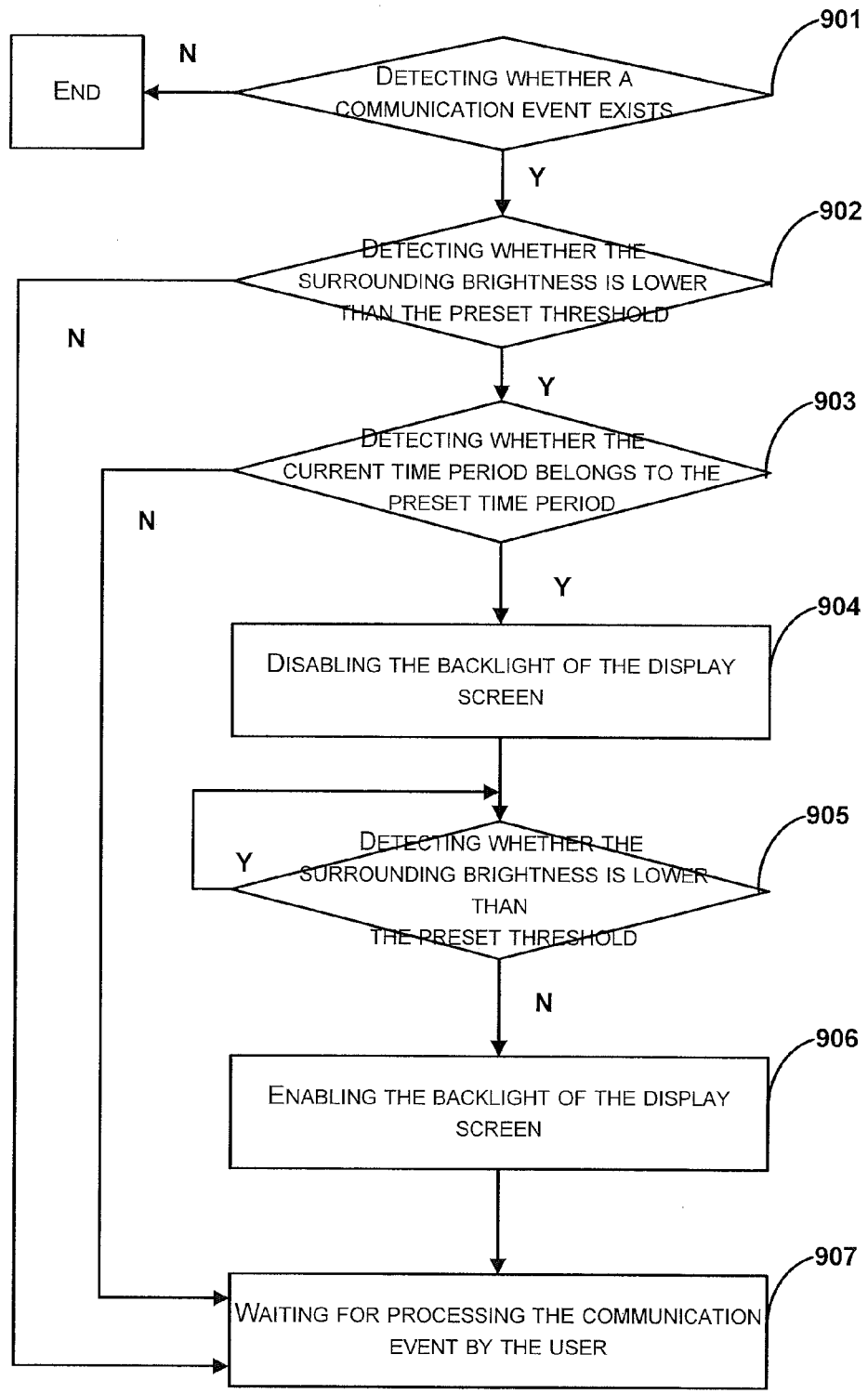
FIG. 9 is yet another flowchart schematically showing a display screen backlight control method according to an embodiment of the present invention.

FIG. 9 is yet another flowchart schematically showing a display screen backlight control method according to an embodiment of the present invention. The display screen backlight control method is used in an electronic terminal, the electronic terminal having a display screen with a display region, the method including:

Step 901, detecting whether a communication event exists. If so, the method proceeds to step 902; otherwise, the method is ended.

Step 902, detecting whether the surrounding brightness is lower than the preset threshold. If so, the method proceeds to step 903; otherwise, the method proceeds to step 907.

Step 903, detecting whether the current time period belongs to the preset time period. If so, the method proceeds to step 904; otherwise, the method proceeds to step 907.

Step 904, disabling the backlight of the display screen. In addition at the same time, the ring tone and/or vibration may be output to prompt the user that the communication event occurs.

Step 905, detecting whether the surrounding brightness is lower than the preset threshold. If so, the method proceeds to make further detection; otherwise, the method proceeds to step 906.

Step 906, enabling the backlight of the display screen.

Step 907, waiting for processing the communication event by the user.

Figure 10:
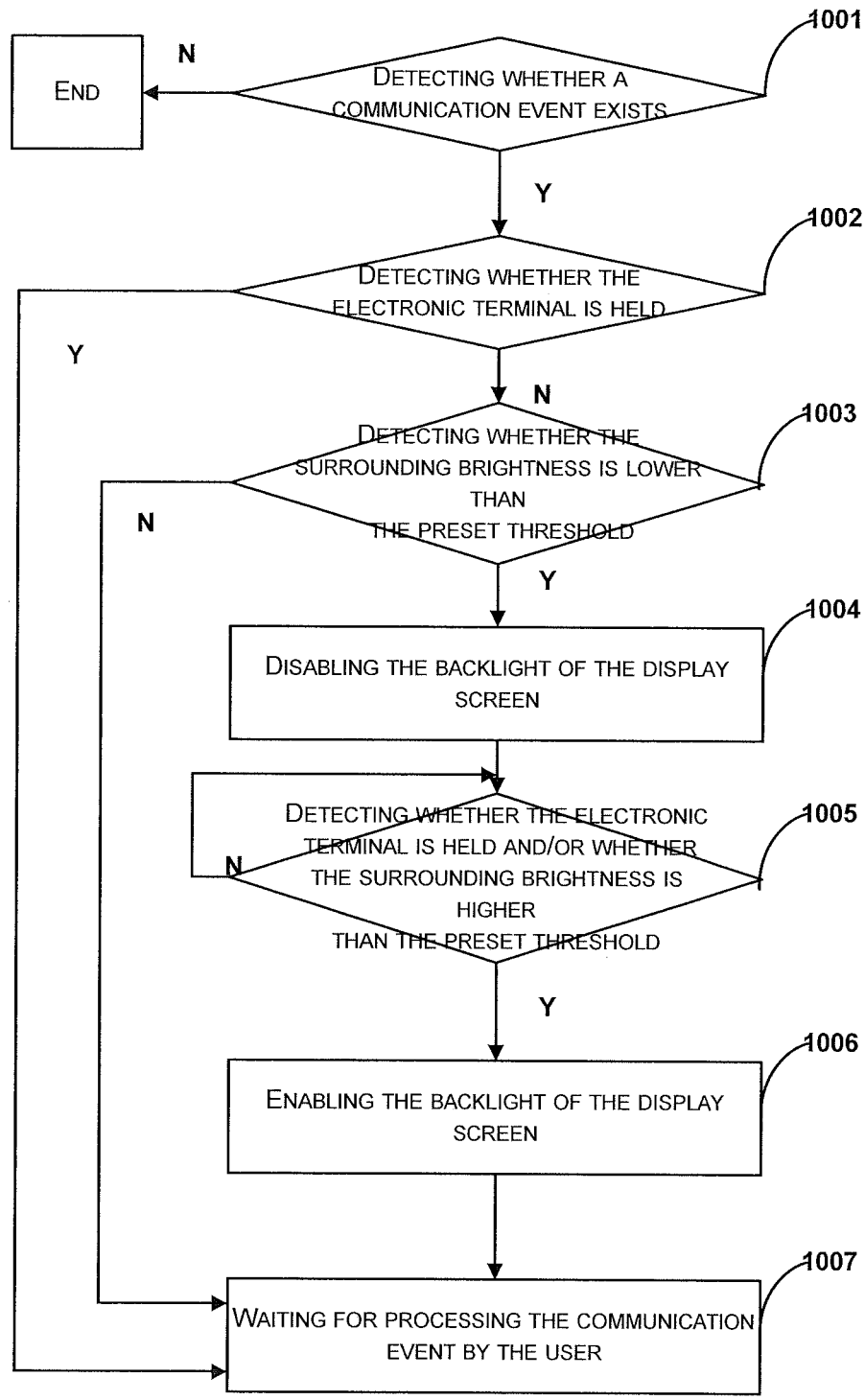
FIG. 10 is yet another flowchart schematically showing a display screen backlight control method according to an embodiment of the present invention.

FIG. 10 is yet another flowchart schematically showing a display screen backlight control method according to an embodiment of the present invention. The display screen backlight control method is used in an electronic terminal, the electronic terminal having a display screen with a display region, the method including:

Step 1001, detecting whether a communication event exists. If so, the method proceeds to step 1002; otherwise, the method is ended.

Step 1002, detecting whether the electronic terminal is held. If so, the method proceeds to step 1007; otherwise, the method proceeds to step 1003.

Step 1003, detecting whether the surrounding brightness is lower than the preset threshold. If so, the method proceeds to step 1004; otherwise, the method proceeds to step 1007.

Step 1004, disabling the backlight of the display screen.

Step 1005, detecting whether the electronic terminal is held and/or whether the surrounding brightness is higher than the preset threshold. If so, the method proceeds to step 1006; otherwise, the method proceeds to make further detection.

Step 1006, enabling the backlight of the display screen. That is, when it is detected that the electronic terminal is held, or it is detected that the surrounding brightness is higher than the preset threshold, or it is detected that the electronic terminal is held and the surrounding brightness is higher than the preset threshold, the backlight of the display screen is enabled.

Step 1007, waiting for processing the communication event by the user.

According to the display screen backlight control method as provided by the embodiment as described above, when the communication event exists, and the user cannot see the display prompt of the display screen (e.g. when the electronic terminal is placed in the pocket or bag), the backlight of the display screen of the electronic terminal is enabled, so as to reduce the power consumption of the electronic terminal and to save the battery power of the electronic terminal.

Many functional components as described in the specification may be referred to as "modules", so as to specifically emphasize independency of their implementations.

In the embodiments of the present invention, the modules may be implemented by software, so as to be executed by various types of processors. For example, an identified executable code module may include one or more physical or logic blocks of computer instructions. For example, it may be constructed as an object, a process or a function. However, the executable code of the identified module may not be placed together physically, but may include different instructions stored in different positions. When these instructions are connected together logically, they construct a module and may implement a prescribed purpose of the module.

Actually, the executable code module may be a single instruction or a plurality of instructions, and may even be distributed over different code segments, over different programs or across a plurality of storage devices. Similarly, the operation data may be identified in the module, and may be implemented in any appropriate form and be organized in any appropriate type of data structure. The operation data may be collected as a single data set, or may be distributed over different positions (including at different storage devices), and may at least partly exist in the system or network only as electronic signals.

When the module may be implemented by software, considering current hardware manufacture process, the skilled in the art may build corresponding hardware circuits to implement corresponding functions for the modules capable of being implemented by software, if the costs thereof are not considered. The hardware circuits may include common Very Large Scale Integration (VLSI) circuits or gate arrays and current semi-conductor devices such as logic chips, transistors or other separated devices. The modules may also be implemented by programmable hardware devices such as Field Programmable Gate Arrays, Programmable Array Logics, Programmable Logic devices etc.

The present invention has been described above with reference to the preferred embodiments thereof. It should be understood that various modifications, alternations and additions can be made by those skilled in the art without departing from the spirits and scope of the present invention. Therefore, the scope of the present invention is not limited to the above particular embodiments but only defined by the claims as attached.

We claim:

1. An electronic terminal comprising at least one input and output unit, the electronic terminal further comprising:
   a memory configured to store a set of instructions;
   a processor coupled to the memory and configured to execute an instruction in the set of instructions for:
   detecting whether a communication event exists, so as to obtain a first detection result;
   detecting whether a prohibition condition for prohibiting an input and output function of the at least one input and output unit is satisfied in response to the first detection result indicating that the communication event exists, so as to obtain a second detection result; and
   prohibiting a part of the input and output function of the at least one input and output unit which is unrelated to the communication event, when the first detection result indicates that the communication event exists and the second detection result indicates that the prohibition condition is satisfied,
   wherein the electronic terminal further comprises:
   a brightness sensing unit configured to detect whether surrounding brightness is lower than a preset threshold, and
   wherein the processor is further configured to execute an instruction in the set of instructions for obtaining the second detection result indicating that the prohibition condition is satisfied, when the brightness sensing unit detects that the surrounding brightness is lower than the preset threshold;
   wherein the processor is further configured to execute an instruction in the set of instructions for detecting whether a current time period belongs to a preset time period; and
   wherein the processor is further configured to execute an instruction in the set of instructions for obtaining the second detection result indicating that the prohibition condition is satisfied, when the brightness sensing unit detects that the surrounding brightness is lower than the preset threshold, the current time period belongs to the preset time period, and
   wherein the electronic terminal further comprises:
   a hold sensing unit configured to detect whether the electronic terminal is held, and
   wherein the processor is further configured to execute an instruction in the set of instructions for obtaining the second detection result indicating that the prohibition condition is satisfied, when the hold sensing unit detects that the electronic terminal is not held.

2. The electronic terminal according to claim 1, wherein the at least one input and output unit comprises a touch sensing unit having a touch sensing region, and
   wherein the processor is further configured to execute a instruction in the set of instructions for:
   detecting whether a prohibition condition for prohibiting an input function of the touch sensing unit is satisfied in response to the first detection result indicating that the communication event exists, so as to obtain the second detection result; and
   prohibiting the input function of the touch sensing unit, when the first detection result indicates that the communication event exists and the second detection result indicates that the prohibition condition is satisfied.

3. The electronic terminal according to claim 2, further comprises:
   an approach sensing unit having a detection region which at least partly overlaps with the touch sensing region, the approach sensing unit is configured to detect whether there is an object located in the detection region,
   wherein the processor is further configured to execute an instruction in the set of instructions for obtaining the second detection result indicating that the prohibition condition is satisfied, when the approach sensing unit detects that there is the object located in the detection region.

4. The electronic terminal according to claim 2, further comprises:
   a hold sensing unit configured to detect whether the electronic terminal is held; and
   a brightness sensing unit configured to detect whether surrounding brightness is lower than a preset threshold,
   the processor is further configured to execute an instruction in the set of instructions for obtaining the second detection result indicating that the prohibition condition is satisfied, when the hold sensing unit detects that the electronic terminal is not held and the brightness sensing unit detects that the surrounding brightness is lower than the preset threshold.

5. The electronic terminal according to claim 2, wherein the processor is further configured to execute an instruction in the set of instructions for:

performing a corresponding touch-control instruction according to a touch input detected by the touch sensing unit; and prohibiting the input function of the touch sensing unit by prohibiting the touch sensing unit from detecting the touch input and/or prohibiting from executing the touch-control instruction, when the first detection result indicates that the communication event exists and the second detection result indicates that the prohibition condition is satisfied.

6. The electronic terminal according to claim 2, wherein the processor is further configured to execute an instruction in the set of instructions for:

enabling the input function of the touch sensing unit, when the second detection result is switched from indicating that the prohibition condition is satisfied to indicating that the prohibition condition is not satisfied.

7. The electronic terminal according to claim 1, wherein the at least one input and output unit comprises a display screen having a display region; the processor is further configured to execute an instruction in the set of instructions for:

detecting whether a prohibition condition for disabling backlight of the display screen is satisfied in response to the first detection result indicating that the communication event exists, so as to obtain the second detection result; and disabling the backlight of the display screen, when the first detection result indicates that the communication event exists and the second detection result indicates that the prohibition condition is satisfied.

8. The electronic terminal according to claim 7, further comprises:

an approach sensing unit having a detection region which at least partly overlaps with the display region, the approach sensing unit configured to detect whether there is an object located in the detection region, wherein the processor is further configured to execute an instruction in the set of instructions for obtaining the second detection result indicating that the prohibition condition is satisfied, when the approach sensing unit detects that there is the object located in the detection region.

9. The electronic terminal according to claim 7, further comprises:

a brightness sensing unit configured to detect whether surrounding brightness is lower than a preset threshold, and wherein the processor is further configured to execute an instruction in the set of instructions for obtaining the second detection result indicating that the prohibition condition is satisfied, when the brightness sensing unit detects that the surrounding brightness is lower than the preset threshold; and wherein the processor is further configured to execute an instruction in the set of instructions for detecting whether a current time period belongs to a preset time period; and wherein the processor is further configured to execute an instruction in the set of instructions for obtaining the second detection result indicating that the prohibition condition is satisfied, when the brightness sensing unit detects that the surrounding brightness is lower than the preset threshold, and t the current time period belongs to the preset time period.

10. The electronic terminal according to claim 7, further comprises:

a hold sensing unit configured to detect whether the electronic terminal is held, wherein the processor is further configured to execute an instruction in the set of instructions for obtaining the second detection result indicating that the prohibition condition is satisfied, when the hold sensing unit detects that the electronic terminal is not held.

11. The electronic terminal according to claim 7, further comprises:

a hold sensing unit configured to detect whether the electronic terminal is held; and a brightness sensing unit configured to detect whether surrounding brightness is lower than a preset threshold, wherein the processor is further configured to execute an instruction in the set of instructions for obtaining the second detection result indicating that the prohibition condition is satisfied, when the hold sensing unit detects that the electronic terminal is not held and the brightness sensing unit detects that the surrounding brightness is lower than the preset threshold.

12. The electronic terminal according to claim 7, wherein the processor is further configured to execute an instruction in the set of instructions for outputting prompt information when the first detection result indicates that the communication event exists and the second detection result indicates that the prohibition condition is satisfied.

13. The electronic terminal according to claim 7, wherein the processor is further configured to execute an instruction in the set of instructions for enabling the backlight of the display screen, when the first detection result indicates that the communication event exists and the second detection result is switched from indicating that the prohibition condition is satisfied to indicating that the prohibition condition is not satisfied.

14. A control method used in an electronic terminal, the electronic terminal comprising at least one input and output unit, the method comprising steps of:

detecting whether a communication event exists, so as to obtain a first detection result;

detecting whether a prohibition condition for prohibiting an input and output function of the at least one input and output unit is satisfied in response to the first detection result indicating that the communication event exists, so as to obtain a second detection result;

prohibiting a part of the input and output function of the at least one input and output unit which is unrelated to the communication event, when the first detection result indicates that the communication event exists and the second detection result indicates that the prohibition condition is satisfied, wherein the step of detecting whether the prohibition condition for prohibiting the input function of the touch sensing unit is satisfied in response to the first detection result indicating that the communication event exists so as to obtain the second detection result comprises:

detecting whether surrounding brightness is lower than a preset threshold;

detecting whether a current time period belongs to a preset time period, when it is detected that the surrounding brightness is lower than the preset threshold;

obtaining the second detection result indicating that the prohibition condition is satisfied, when the current time period belongs to the preset time period, and wherein the step of detecting whether the prohibition condition for prohibiting the input function of the touch sensing unit is satisfied in response to the first detection result indicating that the communication event exists so as to obtain the second detection result further comprises:

detecting whether the electronic terminal is held;

obtaining the second detection result indicating that the prohibition condition is satisfied, when it is detected that the electronic terminal is not held.

15. The control method according to claim 14, wherein the at least one input and output unit comprises a touch sensing unit having a touch sensing region, the method comprising:

detecting whether a prohibition condition for prohibiting an input function of the touch sensing unit is satisfied in response to the first detection result indicating that the communication event exists, so as to obtain the second detection result; and prohibiting the input function of the touch sensing unit, when the first detection result indicates that the communication event exists and the second detection result indicates that the prohibition condition is satisfied.

16. The control method according to claim 15, wherein the step of detecting whether the prohibition condition for prohibiting the input function of the touch sensing unit is satisfied in response to the first detection result indicating that the communication event exists so as to obtain the second detection result comprises:

detecting whether there is an object located in the detection region which at least partly overlaps with the touch sensing region;

obtaining the second detection result indicating that the prohibition condition is satisfied, when it is detected that there is the object located in the detection region;

wherein the step of detecting whether the prohibition condition for prohibiting the input function of the touch sensing unit is satisfied in response to the first detection result indicating that the communication event exists so as to obtain the second detection result comprises:

detecting whether surrounding brightness is lower than a preset threshold;

obtaining the second detection result indicating that the prohibition condition is satisfied, when it is detected that the surrounding brightness is lower than the preset threshold.

* * * * *